(12) United States Patent
Negro et al.

(10) Patent No.: US 7,147,460 B2
(45) Date of Patent: Dec. 12, 2006

(54) DEVICE FOR SHAPING PLASTIC OBJECTS UNDER INERT ATMOSPHERE

(75) Inventors: Olivier Negro, Paris (FR); Sami Dick, Le Chesnay (FR); Marc Leturmy, Gressey (FR); Stéphane Melen, Herqueville (FR)

(73) Assignee: L'Air Liquide, Societe Anonyme A Directoire et Conseil de Surveillance pour l'Etude et, l'Exploitation des Procedes Georges Claude, Paris (FR)

( * ) Notice: Subject to any disclaimer, the term of this patent is extended or adjusted under 35 U.S.C. 154(b) by 204 days.

(21) Appl. No.: 10/363,516

(22) PCT Filed: Sep. 10, 2001

(86) PCT No.: PCT/FR01/02798

§ 371 (c)(1),
(2), (4) Date: Jul. 14, 2003

(87) PCT Pub. No.: WO02/22342

PCT Pub. Date: Mar. 21, 2002

(65) Prior Publication Data

US 2004/0005379 A1    Jan. 8, 2004

(30) Foreign Application Priority Data

Sep. 13, 2000    (FR)    .................... 00 11655

(51) Int. Cl.
*B29C 35/04* (2006.01)
(52) U.S. Cl. ............... 425/584; 366/101; 425/546; 425/542; 425/578; 222/4; 264/85
(58) Field of Classification Search ........... 425/4 R, 425/817 R, 546, 576.1, 578, 584, 210, 542, 425/178.1; 264/85, 555, 177.17; 366/101, 366/76.9, 76.93; 222/3, 4
See application file for complete search history.

(56) References Cited

U.S. PATENT DOCUMENTS

| 2,641,799 A | * | 6/1953 | McDonald et al. ...... 425/378.1 |
| 4,823,680 A | * | 4/1989 | Nowotarski ................. 454/188 |
| 6,080,642 A | * | 6/2000 | Van Geelen et al. ........ 438/478 |
| 6,270,705 B1 | | 8/2001 | De Wilde et al. |

FOREIGN PATENT DOCUMENTS

| DE | 299 23 183 | | 9/2000 |
| JP | 11123743 A | * | 5/1999 |

OTHER PUBLICATIONS

International Search Report for PCT/FR01/02798.

(Continued)

*Primary Examiner*—Joseph S. Del Sole
*Assistant Examiner*—Maria Veronica Ewald
(74) *Attorney, Agent, or Firm*—Christopher J. Cronin; Brandon S. Clark

(57) ABSTRACT

The invention relates to a device for producing plastic articles by forming them in an inert atmosphere, the device comprising a hopper, a feed screw and means for forming the polymer melt. The device for injecting inert gas comprises a gas feed pipe, a gas injection surface near the wall of the hopper and a homogenization chamber fitted between the wall of the hopper and the gas feed pipe. That end of the gas feed pipe which is directed towards the injection surface is closed and has at least one radial opening O allowing the gas to be ejected at right angles to its direction of flow in the pipe.

22 Claims, 2 Drawing Sheets

OTHER PUBLICATIONS

Patent Abstracts of Japan, vol. 2000, No. 04, Aug. 31, 2000, & JP 2000 015639, Jan. 18, 2000, Canon, Inc.
Patent Abstracts of Japan, vol. 1998, No. 11, Sep. 30, 1998, & JP 10 146837, Jun. 2, 1998, Sumitomo Heavy Ind. Ltd.
Patent Abstracts of Japan, vol. 1999, No. 10, Aug. 31, 1999, & JP 11 123743, May 11, 1999, Niigata Eng. Co. Ltd.
Patent Abstracts of Japan, vol. 1999, No. 02, Feb. 26, 1999, & JP 10 300056, Nov. 13, 1998, Iwatani Internatl. Corp.

* cited by examiner

# DEVICE FOR SHAPING PLASTIC OBJECTS UNDER INERT ATMOSPHERE

BACKGROUND

The invention relates to an inerting method that can be applied to the production of plastic articles by extrusion or injection moulding.

The extrusion or injection moulding of plastic is a known process which consists in melting a polymer and in continuously feeding the polymer melt into a die or injection-moulding head in order to form it. In general, this process employs:

- a polymer feed hopper into which the polymer is introduced in powder or granule form;
- means for transporting, heating and mixing the polymer coming from the hopper, for example a heated feed screw;
- an extrusion head consisting of a die head giving the polymer the desired shape or a head for injecting it into a mould.

It is known that during this type of process, and especially during the melting step in the feed screw, certain polymers may be sensitive to the presence of oxygen, the latter degrading the final properties of the formed plastic (yellowing, cross-linking of the polymer, variation in the molecular mass). The Applicant has also found that oxygen results in:

- fouling of the forming device, which makes it necessary for the production tool to be cleaned, and therefore stopped, regularly, hence resulting in high maintenance costs and in loss of production;
- the presence of deposits on the surface of the formed polymer.

To remedy the problem of degradation of the final products of the formed plastic, it is known to add antioxidants to the initial polymer. However, these additives considerably increase the production cost of the plastic. Another approach in the prior art consists in forming the polymer in the presence of an inert gas. This approach was, for example developed in Application EP-A1-0 760 278. According to the method described in that application, the best inerting results could be obtained only by introducing the inert gas at a precise point on the feed screw. In the case of an existing industrial plant, introducing inert gas into the feed screw may prove to be complicated, or even impossible, as it is necessary to drill the cylindrical body of the screw without this drilling disturbing the subsequent operation of the screw. Furthermore, this preferred implementation allowed the residual oxygen content in the nitrogen to be lowered by a value of only 1% by volume.

SUMMARY

The invention includes apparatus to achieve the desired results, as described, but it is not limited to the various embodiments disclosed.

An object of the present invention is to provide an improved device for forming in an inert atmosphere, making it possible in particular to easily modify an existing industrial plant and to lower the oxygen content more than in the prior art.

For this purpose, the invention firstly relates to a device for producing plastic articles by the forming of a polymer, the said device comprising:

- a polymer feed hopper,
- means for heating and for moving the melting polymer,
- means for forming the polymer melt, and
- at least one means for injecting gas into the hopper, the said gas injection means comprising;
  - at least one gas injection surface near the wall of the hopper;
  - a pipe for feeding gas into the hopper via this gas injection surface;
    - one end of which pipe is connected to a gas supply, the other end of which pipe, directed towards the injection surface, is closed,
    - and which has at least one radial opening o allowing the gas to be ejected at right angles to its direction of flow in the pipe; and
  - a homogenization chamber fitted between the wall of the hopper and the wall of the gas feed pipe so that the gas leaving the opening o enters the hopper via the injection surface.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
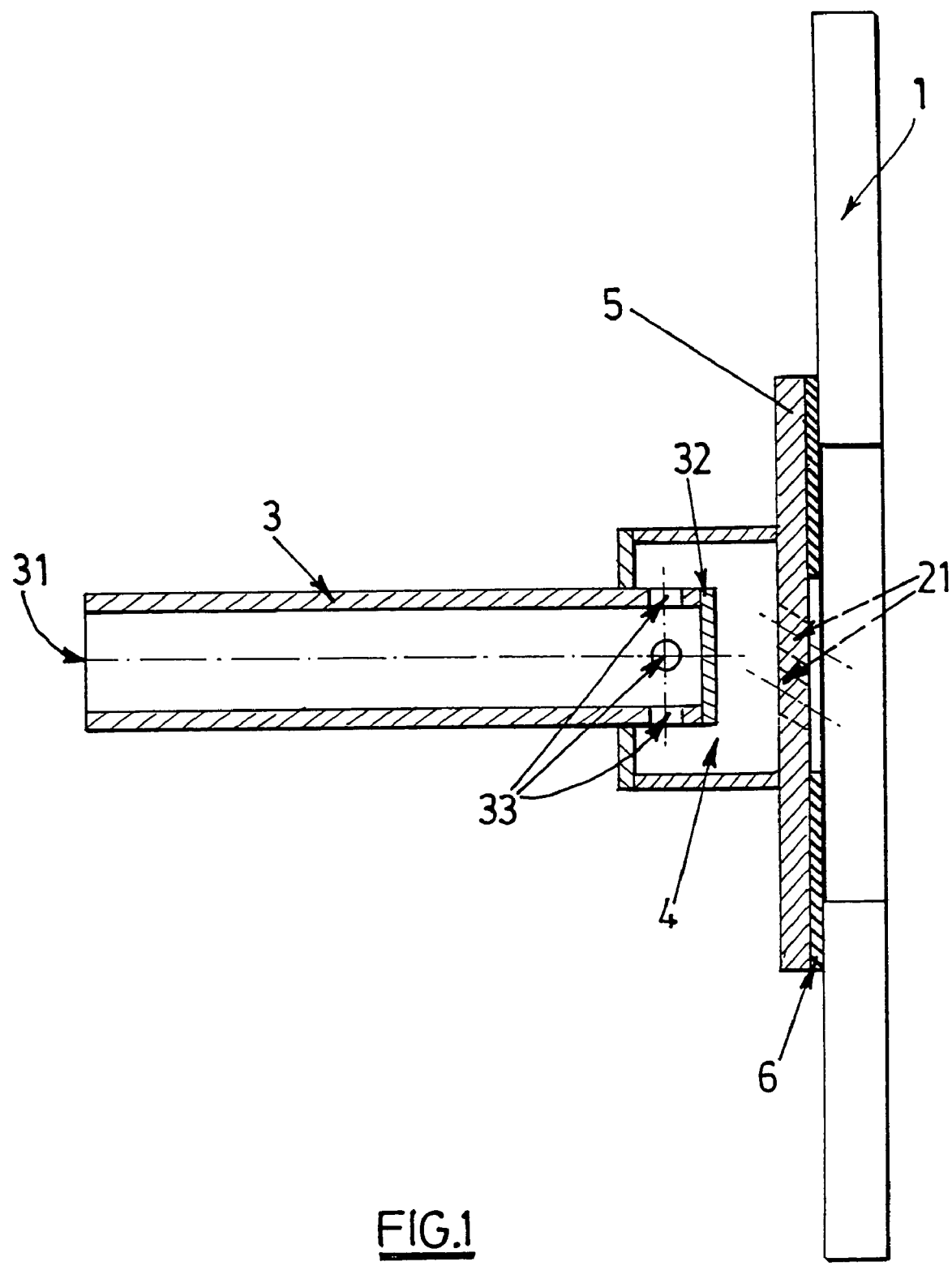
FIG. 1 illustrates a schematic representation of one embodiment according to the current invention.

The invention includes apparatus for producing plastic articles by forming a polymer, as described above.

The means for heating and for moving the melting polymer generally consist of a temperature-controlled barrel inside which at least one feed screw is placed. This type of screw also mixes the melting polymer. The means for forming the polymer melt are, in the case of extrusion, usually a die head having a geometrical shape tailored to the desired forming operation: sheet, film (flat die), profile, tube (circular die). If the polymer melt is formed by injection moulding, the forming means is then a mould.

The feed hopper is usually a container having funnel-shaped discharge sections through which the polymer flows under gravity. It may include means for regulating the flow of the polymer, such as rotary or vibratory stirrers or a forcing screw. According to the invention, the hopper has, in at least one of its walls, a gas injection means. This gas injection means comprises, near the wall of the hopper, at least one gas injection surface. This injection surface may consist of a porous body or of injection orifices, preferably at least one orifice O. This orifice O may be drilled directly in the wall of the hopper or drilled in a plate which is itself fastened to the wall of the hopper at the place where there is an opening in the wall. The latter embodiment may correspond to the case in which the present invention is applied to a forming device which is already being used and which has to be adapted; thus, it is possible to replace a viewing window normally present in the wall of the hopper with a plate drilled with at least one orifice O and fastened to the wall of the hopper. The orifice or orifices O preferably create a gas flow oriented towards the bottom of the hopper, the axis of the injection orifice or orifices possibly making an angle of at least 30° with the horizontal axis. It is also preferable for the gas injection means to be located set back from the path of the polymer in the hopper and not to penetrate the internal volume of the hopper. Thus, it may be placed flush with the internal wall of the hopper. This is the case when the gas injection orifice O is a simple hole drilled in the wall of the hopper. According to a very particular embodiment, the injection orifice or orifices O may be replaced by a porous body.

These orifices O form part of the means for injecting gas into the hopper, which means also includes a pipe for feeding gas into these gas injection orifices O and a homogenization chamber fitted between the wall of the hopper and the wall of the feed pipe. The homogenization chamber can be of any possible shape. Its volume is preferably fixed so that the velocity of the gas in the said chamber is less than the velocity of the gas in the orifice or orifices O drilled in the wall of the hopper. The chamber must be sealed so as to ensure that the gas flows from the gas feed pipe into the gas injection orifices O. For example, elastomer seals may be placed around the edges of the homogenization chamber in contact with the wall of the hopper and around the edges of the homogenization chamber in contact with the wall of the feed pipe.

According to the preferred embodiment, the cross section A of the homogenization chamber in contact with the wall of the hopper and the cross sections $a_i$ of the gas injection orifices O drilled in the wall of the hopper satisfy the following relationship: the ratio $A/\Sigma a_i$ is greater than or equal to 1, preferably greater than or equal to 1.5, $\Sigma a_i$ representing the sum of the cross sections of the orifices O. For practical reasons, the gas injection orifices O drilled in the wall of the hopper all have the same cross section a.

The gas is brought into the homogenization chamber via the gas feed pipe which may have a cross section in a variety of shapes, such as round, square or rectangular. One end of the pipe is connected to a supply of inert gas, such as nitrogen. The other end is directed towards the orifice or orifices O and is closed in its cross section. The pipe has at least one radial opening o allowing the gas to be ejected at right angles to its direction of flow in the pipe and towards the homogenization chamber. If there are several openings o, these are usually located in the same cross section of the gas feed pipe. According to the preferred embodiment, the internal cross section S of the gas feed pipe and the cross sections $s_i$ of the openings o satisfy the following relationship: the ratio $S/\Sigma s_i$ is greater than or equal to 1, preferably greater than or equal to 1.5, $\Sigma s_i$ representing the sum of the cross sections $s_i$ of the openings o. The radial opening or openings o in the gas feed pipe may all have the same cross section s. According to one particular embodiment, the gas feed pipe has four openings o placed in the same cross section of the pipe.

The characteristics of the invention make it possible to obtain laminar flow of the gas in the hopper and at a velocity which does not disturb the flow of polymer in this hopper.

If there are several orifices O in the wall of the hopper, the means for injecting gas into the hopper according to the invention make it possible to obtain the same flow rate of inert gas in each orifice O.

The injection means may be placed at any height in the hopper with respect to the screw without the inerting results being modified as a result.

Depending on the diameter of the hopper, several injection means of the above type may be placed in the wall of the said hopper. These injection means are then generally placed at the same height in the hopper with respect to the screw and equidistant from one another.

By using the device according to the invention, the inert gas introduced into the hopper is firstly taken with the polymer into the extruder, then taken back towards the hopper countercurrent-wise with respect to the flow of polymer and finally removed from the extruder via the hopper. This use makes it possible to form a buffer of inert gas in the hopper region.

The gas may be any inert gas normally used for inerting polymers. In general, it is nitrogen and preferably nitrogen obtained cryogenically. It is possible to use so-called impure nitrogen which may contain oxygen and/or argon, or even CO or $CO_2$, the nitrogen content in the gas being at least 95% and the oxygen content at most 5%. This type of gas based on impure nitrogen may come from a process for separating the gases from air using a membrane. However, this type of gas can be used only when it is desired to obtain an atmosphere with a relatively low oxygen content, that is to say one possibly having up to 5% by volume of oxygen. Optionally, before being injected the gas used may be preheated to a temperature close to the melting point of the polymer treated. However, this preheating has no influence on the quality of the inerting.

By injecting nitrogen obtained cryogenically, the device according to the invention makes it possible to form polymers in an atmosphere having less than 100 ppm oxygen for a nitrogen injection speed of less than 50 m/s, or indeed less than 20 m/s and even less than 3 m/s, depending on the form and the flow rate of the polymer introduced. It has also be found that this device significantly reduces the fouling of the feed screw and of the die head, thereby limiting the machine down times for cleaning purposes and increasing the productivity. This makes it possible to reduce, or even dispense with, the use of an antioxidant.

One advantage of the device according to the invention is that the inert-gas injection means may be placed on the hopper at any height with respect to the screw without affecting the inerting results. It is therefore possible to modify existing industrial plants by customizing to suit each particular case.

Another advantage is that very effective inerting is obtained by injecting the inert gas at a single point in the process and without it being necessary to heat the gas.

The invention also relates to the use of the above device for the forming, especially by extrusion, of high-density or low-density polyethylene or of polypropylene, introduced in granular or powder form.

Finally, the invention relates to a gas injection means that can be fitted onto the feed hopper of any type of device requiring the injection of a gas, such as an inerting gas. This injection means comprises:

a gas feed pipe:
   one end of which is connected to a gas supply,
   the other end of which is closed,
   and which has at least one radial opening o allowing the gas to be ejected at right angles to its direction of flow in the pipe; and a homogenization chamber co-operating with the gas feed pipe so that the gas ejected from the opening o enters the homogenization chamber.

The preferred technical characteristics of this injection means are identical to those defined above for the device for producing plastic articles by the forming of a polymer using this same gas injection means. This injection means may be fastened over a hole drilled in the wall of the feed hopper so that gas can be fed into the hopper, and preferably respecting the characteristics defined above for the ratio $A/\Sigma a_i$ of the cross sections (A being the cross section of the homogenization chamber in contact with the wall of the hopper and $a_i$ being the cross sections of the gas injection orifices O drilled in the wall of the hopper). This gas injection means may be tailored to all devices requiring a gas to be injected onto their feed hopper, which may be the case of devices for cryogenically grinding food products or plastics.

Figure 2:
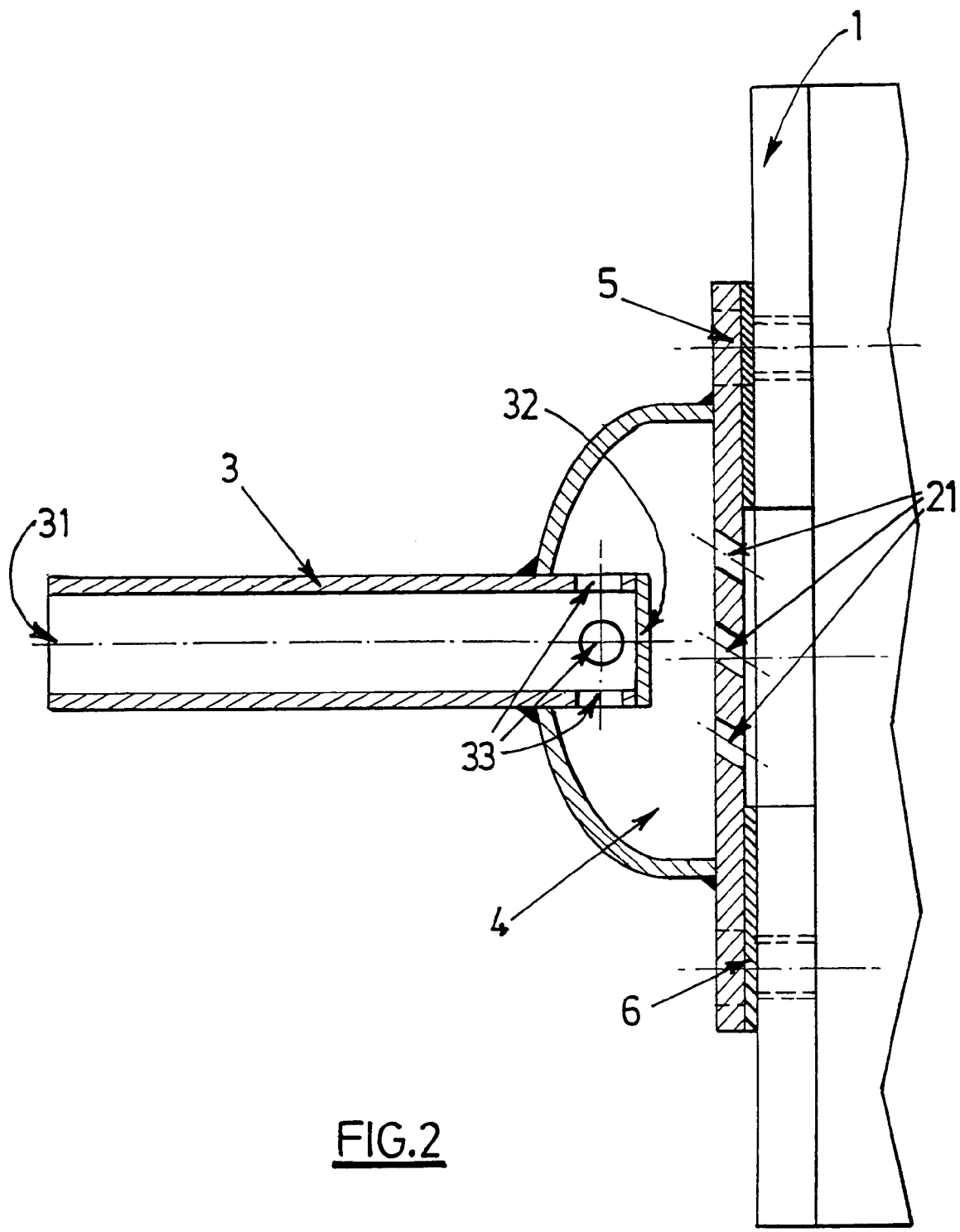
FIG. 2 illustrates a schematic representation of a second embodiment according to the current invention.

FIGS. 1 and 2 show schematically cross sections of devices suitable for implementing the invention. The devices fit onto a hopper allowing a polymer to be introduced into the channel of a feed screw, this screw delivering the polymer into a die head.

In FIG. 1, a gas injection means is placed on the wall of the hopper (1). It comprises:
- 3 circular gas injection orifices O (21), 0.55 cm in diameter, drilled in a plate (5) screwed onto the wall of the hopper instead of a viewing window; these orifices O (21) are oriented downwards at an angle of 30° to the horizontal axis;
- a pipe (3) for feeding gas to these gas injection orifices O (21). This is a pipe of circular cross section 1.5 cm in diameter. Its end (31) is connected to a gas supply. Its other end (32) is plugged. In its portion near the plugged end (32), the pipe has four circular openings o (33) all of the same diameter (0.5 cm) placed in the same cross section of the pipe and equidistant from one another. The ratio $S/\Sigma s_i$ is 2.25;
- a homogenization chamber (4), the cross section of which is circular in shape and the internal diameter of which is 3.6 cm. A silicone seal (6) seals the chamber with respect to the wall of the hopper. The ratio $A/\Sigma s_i$ is 14.3.

In FIG. 2, the hopper includes a means for injecting gas into the hopper, comprising:
- 7 circular gas injection orifices O (21), 0.5 cm in diameter, drilled in a plate screwed onto the wall of the hopper (1) instead of a viewing window; these orifices O (21) are oriented downwards at an angle of 30° to the horizontal axis;
- a pipe (3) for feeding gas to these gas injection orifices O (21). This is a pipe of circular cross section 1.5 cm in diameter. Its end (31) is connected to a gas supply. Its other end (32) is plugged. In its portion near the plugged end (32), the pipe has four circular openings o (33) all of the same diameter (0.5 cm) placed in the same cross section of the pipe and equidistant from one another. The ratio $S/\Sigma s_i$ is 2.25;
- a homogenization chamber (4), the cross section of which is circular in shape and the internal diameter of which is 5 cm. A silicone seal (6) seals the chamber with respect to the wall of the hopper. The ratio $A/\Sigma s_i$ is 25.

EXAMPLES

Example 1

The injection means described in FIG. 1 was placed on the wall of a hopper at a distance of 1.50 m above the feed screw. The hopper was fed with polyethylene in powder form. The particle size of the powder was 2.5 mm and its feed flow rate was 12 kg/h.

Nitrogen output by a cryogenic unit was introduced into the feed pipe (3) via the end (31) with a flow rate of 1.5 m³/h.

A sampling valve was inserted between the hopper and the feed screw and connected to a probe of an analyser having an electrochemical cell for detecting traces of oxygen. Using this probe, it was found that the oxygen content of the atmosphere between the hopper and the feed screw was 140 ppm.

Example 2

Example 1 was repeated, placing the injection means at a distance of 30 cm above the feed screw. All the other conditions of the process were the same.

It was found that the oxygen content of the atmosphere between the hopper and the feed screw was 70 ppm.

Example 3

Two injection means, such as those described in FIG. 2, were placed face to face on the wall of a hopper at a distance of 30 cm above the feed screw. The hopper was fed with polyethylene in granule form. The particle size of the granules was 2.5 mm and its feed flow rate was 300 kg/h.

Nitrogen output by a cryogenic unit was introduced into the injection pipe (3) via the end (31) with a flow rate of 5 m³/h.

A sampling valve was inserted between the hopper and the feed screw and connected to a probe of an analyser having an electrochemical cell for detecting traces of oxygen. Using this probe, it was found that the oxygen content of the atmosphere between the hopper and the feed screw was 30 ppm.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus which may be used for producing plastic articles by forming a polymer, wherein the apparatus comprises:
    a) a polymer feed hopper;
    b) a heating means to heat and move a melting polymer;
    c) a forming means to form melted polymer; and
    d) at least one gas injection means to inject a gas into the hopper, wherein the gas injection means comprises:
        1) at least one gas injection surface near a wall of the hopper;
        2) a gas feed pipe to supply gas to the hopper through the injection surface, wherein the pipe comprises:
            i) a first end connected to a gas supply;
            ii) a second end directed towards the injection surface, wherein the second end is closed; and
            iii) at least one radial opening o which allows the gas to be ejected from the pipe at substantially a right angle to the direction of gas flow within the pipe; and
        3) a homogenization chamber positioned around the injection surface and the gas feed pipe such that the gas exiting the pipe enters the homogenization chamber prior to entering the hopper through the injection surface.

2. The apparatus of claim 1, wherein the gas injection surface near the wall of the hopper comprises at least one orifice O.

3. The apparatus of claim 2, wherein the cross section A of the homogenization chamber in contact with the wall of the hopper and the cross sections $a_i$ of the gas injection orifices O in the wall of the hopper satisfy the following relationship: the ratio $A/\Sigma a_i$ is greater than or equal to about 1, $\Sigma a_i$ representing the sum of the cross sections of the orifices O.

4. The apparatus of claim 3, wherein the ratio $A/\Sigma a_i$ is greater than or equal to about 1.5.

5. The apparatus of claim 2, wherein the gas injection orifice O is drilled in the wall of the hopper and creates a gas flow oriented towards the bottom of the hopper.

6. The apparatus of claim 3, wherein the gas injection orifice O is drilled in the wall of the hopper and creates a gas flow oriented towards the bottom of the hopper.

7. The apparatus of claim 4, wherein the gas injection orifice O is drilled in the wall of the hopper and creates a gas flow oriented towards the bottom of the hopper.

8. The apparatus of claim 1, wherein the gas injection surface near the wall of the hopper comprises a porous body.

9. The apparatus of claim 1, wherein the gas injection means is located away from the path of the polymer in the hopper.

10. The apparatus of claim 2, wherein the gas injection means is located away from the path of the polymer in the hopper.

11. The apparatus of claim 3, wherein the gas injection means is located away from the path of the polymer in the hopper.

12. The apparatus of claim 4, wherein the gas injection means is located away from the path of the polymer in the hopper.

13. The apparatus of claim 5, wherein the gas injection means is located away from the path of the polymer in the hopper.

14. The apparatus of claim 6, wherein the gas injection means is located away from the path of the polymer in the hopper.

15. The apparatus of claim 1, wherein the internal cross section S of the gas feed pipe and the cross sections $s_i$ of the at least one radial opening o satisfies the following relationship: the ratio $S/\Sigma s_i$ is greater than or equal to about 1, $\Sigma s_i$ representing the sum of the cross sections $s_i$ of the least one radial opening o.

16. The apparatus of claim 15, wherein the ratio $S/\Sigma s_i$ is greater than or equal to about 1.5.

17. The apparatus of claim 2, wherein the internal cross section S of the gas feed pipe and the cross sections $s_i$ of the at least one radial opening o satisfies the following relationship: the ratio $S/\Sigma s_i$ is greater than or equal to about 1, $\Sigma s_i$ representing the sum of the cross sections $s_i$ of the at least one radial opening o.

18. The apparatus of claim 3, wherein the internal cross section S of the gas feed pipe and the cross sections $s_i$ of the at least one radial opening o satisfies the following relationship: the ratio $S/\Sigma s_i$ is greater than or equal to about 1, $\Sigma s_i$ representing the sum of the cross sections $s_i$ of the at least one radial opening o.

19. The apparatus of claim 4, wherein the internal cross section S of the gas feed pipe and the cross sections $s_i$ of the at least one radial opening o satisfies the following relationship:

the ratio $S/\Sigma s_i$ is greater than or equal to about 1, $\Sigma s_i$ representing the sum of the cross sections $s_i$ of the at least one radial opening o.

20. An apparatus which may be used as a gas injector suitable to be fitted to a feed hopper on a device requiring the injection of gas, the apparatus comprising:
  a) a gas feed pipe comprising:
    1) a first end connected to a gas supply;
    2) a second end which is closed; and
    3) at least one radial opening o which allows the gas to be ejected from the pipe at substantially a right angle to the direction of gas flow within the pipe; and
  b) a homogenization chamber, wherein:
    1) the chamber is positioned between a wall of the feed hopper to which gas is to be delivered and the gas feed pipe; and
    2) the gas exiting the pipe enters the homogenization chamber.

21. The apparatus of claim 20, wherein the internal cross section S of the gas feed pipe and the cross sections $s_i$ of the at least one radial opening o satisfies the following relationship: the ratio $S/\Sigma s_i$ is greater than or equal to about 1, $\Sigma s_i$ representing the sum of the cross sections $s_i$ of the at least one radial opening o.

22. The apparatus of claim 21, wherein the ratio $S/\Sigma s_i$ is greater than or equal to 1.5.

* * * * *